United States Patent
Bothe et al.

(10) Patent No.: US 7,362,075 B2
(45) Date of Patent: Apr. 22, 2008

(54) BATTERY CHARGER WITH CHARGE STATE DETECTION ON THE PRIMARY SIDE

(75) Inventors: Michael Bothe, Munster (DE); Ralf Schroder gen. Berghegger, Glandorf (DE); Georg Breuch, Greven (DE)

(73) Assignee: Friwo Geraetebau GmbH, Ostbevern (DE)

( * ) Notice: Subject to any disclaimer, the term of this patent is extended or adjusted under 35 U.S.C. 154(b) by 314 days.

(21) Appl. No.: 11/147,417

(22) Filed: Jun. 7, 2005

(65) Prior Publication Data
US 2007/0001648 A1    Jan. 4, 2007

(30) Foreign Application Priority Data
Jun. 8, 2004    (DE) .................. 10 2004 027 833

(51) Int. Cl.
*H01M 10/46* (2006.01)
(52) U.S. Cl. ...................................... 320/134
(58) Field of Classification Search ................ 320/135, 320/155, 108, 125, 134, 136
See application file for complete search history.

(56) References Cited

U.S. PATENT DOCUMENTS

| | | | |
|---|---|---|---|
| 2,585,005 A | 2/1952 | Godshalk et al. | |
| 4,209,736 A | 6/1980 | Reidenbach | |
| 5,568,040 A * | 10/1996 | Krainer et al. | 320/155 |
| 6,340,879 B1 | 1/2002 | Blacker | |
| 6,433,443 B2 * | 8/2002 | Nishida et al. | 307/35 |
| 6,693,413 B1 | 2/2004 | Lanni | |
| 2001/0036089 A1 * | 11/2001 | Gattavari et al. | 363/21.01 |
| 2002/0190694 A1 * | 12/2002 | Saeki et al. | 320/135 |
| 2003/0160594 A1 * | 8/2003 | Trinh et al. | 320/156 |

FOREIGN PATENT DOCUMENTS

| | | |
|---|---|---|
| DE | 8800552.6 U1 | 5/1988 |
| DE | 4307968 | 9/1993 |
| DE | 4414134 | 11/1994 |
| DE | 19829840 | 1/1999 |
| DE | 10018229 | 10/2001 |
| EP | 0522591 | 1/1993 |
| EP | 0692859 | 1/1996 |
| WO | WO 02/37641 | 5/2002 |
| WO | WO 02/45248 | 6/2002 |

OTHER PUBLICATIONS

Phillips Semiconductors, HEF4060B MSI (14-stage ripple-carry binary counter/divider and oscillator) Data Sheet, Jan. 1995. p. 2.*

* cited by examiner

*Primary Examiner*—Edward H Tso
(74) *Attorney, Agent, or Firm*—Michael Best & Friedrich LLP

(57) ABSTRACT

The present invention relates to a battery charger for charging a battery. The present invention especially relates to a battery charger comprising a switching power supply controlled on the primary side and a charge monitoring circuit for monitoring the charge state of the battery. For providing an improved battery charger which allows a secure and reliable charging of batteries with a reduction of the circuit complexity, the costs for appliances and the construction size, the charge monitoring circuit is—according to the invention—disposed in the switching circuit on the primary side of the battery charger.

10 Claims, 4 Drawing Sheets

BATTERY CHARGER WITH CHARGE STATE DETECTION ON THE PRIMARY SIDE

The present invention relates to a battery charger for charging a battery. The present invention especially relates to a battery charger comprising a switching power supply controlled on the primary side and a charge monitoring circuit for monitoring the charge state of the battery.

As is shown, for example, in FIG. 3 a known charging set comprises an AC/DC converter 102 which is formed, for example, by a blocking oscillator-type converter. The blocking oscillator-type converter is connected to act as an electric power source and supplies a constant current for charging batteries which, in the following, are to designate rechargeable batteries, accumulators as well as battery packs or accumulator packs.

Rechargeable batteries such as nickel-cadmium batteries, are frequently used for the power supply of portable electronic devices. Usually, the electric potential between the positive and negative electrodes of the battery is detected during the charging process of such a battery. If the measured potential increases, the battery is charged in the usual way whereas, when the measured potential drops, the battery charging process is terminated because the battery is fully charged.

Moreover, it is known that certain batteries, such as the so-called nickel metallic hydride batteries, produce a large amount of heat during the charging process. If such nickel metallic hydride batteries were charged until the potential between the positive and the negative electrodes starts to drop, the temperature rise would become too high.

Frequently, the nickel metallic hydride batteries are therefore provided with temperature sensors as to allow a temperature monitoring. Both, the information about the voltage on the battery and about the measured temperature are further processed by a charge controller 104 so that the charging process can be controlled correspondingly. The charge controller 104 performs the total charging management, such as a reduction of the charging current to a float charge current after the full charge was detected, and the evaluation of different information, such as the charging period, the occurring temperature or the cell voltage on the battery. As is schematically shown in FIG. 4, the blocking oscillator-type converter 102 thereby makes a corresponding output characteristic available, e.g. an I/U characteristic. The charge controller 104 controls this characteristic in dependence on the time and thus represents a charge characteristic $U,I=f(t)$.

FIG. 5 shows a block diagram of a battery charger 100 according to the prior art. As can be seen in the figure, the device comprises a primary side 106 connected to the line voltage, and a secondary side 108 connected to the battery. The primary side 106 and the secondary side 108 have to be electrically isolated from each other.

If a blocking oscillator-type converter with a regulation circuit 110, as is shown in the German publication DE 100 18 229 A1, is used in the battery charger 100, the regulation circuit 110 is disposed on the primary side 106, and the output characteristic is merely derived from the regulation of the current on the primary side and from a voltage consumed from an auxiliary winding and proportional to the secondary voltage. As is shown in FIG. 5, the required charge monitoring circuit (the charge controller of FIG. 3) of the known constructions is however disposed on the secondary side 108 and controls the charging process via an optoelectronic coupler. Nowadays, a microcontroller or a so-called battery management IC is frequently used for performing the required measurement of the battery parameters.

The solution shown in FIG. 5 has the drawback, however, that the necessary components require a considerable circuit periphery which needs corresponding space for the printed circuit board and is comparatively expensive. Moreover, the circuit expenditure also increases the required space and, thus, the geometric dimensions of the battery charger.

The present invention is therefore based on the object to provide an improved battery charger which allows a secure and reliable charging of batteries, with a reduction of the circuit complexity, the costs for appliances and the construction size.

This object is achieved by the subject matter of patent claim 1. Advantageous embodiments of the present invention form the subject matter of the dependent claims.

The present invention is based on the idea to integrate the charge monitoring in the regulation and driver circuit on the primary side of a switching power supply controlled on the primary side. In this way, a separate charging connection on the secondary side can be waived, and both the number and the complexity of the components, as well as the geometric dimensions of the battery charger, are reduced in an advantageous manner. Moreover, the battery itself need not be provided with a temperature monitor, so that the complexity and the price of the batteries may be reduced.

According to an advantageous embodiment of the present invention the charge monitoring circuit comprises a temperature detection device for detecting the temperature of the battery. Thus, the power transfer can be adjusted on the basis of the temperature information. This has the advantage that too high a temperature rise is avoided without the requirement to provide a temperature detector, e.g. a thermistor, on the battery. Moreover, the battery and the battery charger need not comprise any connections for transmitting temperature information from the battery to the battery charger, so that the structure of both the battery and the battery charger can be facilitated.

According to an advantageous embodiment of the present invention an electrically isolated temperature-dependent resistor having a good thermal coupling to the battery or the accumulator is provided for the temperature detection, which transmits the temperature information to the charge controller 104 accommodated in the power management IC. Such a temperature-dependent resistor can, for example, be a resistor with negative temperature coefficients, a so-called NTC-resistor. Moreover, the charge monitoring circuit may comprise a time switching device so that the power transfer is terminated after a predetermined charging period. Such a limitation of the charging process to a maximum charging period has the advantage that the battery charger is additionally secured and is thus more reliable.

For example, an adjustable oscillator formed by an RC-module, which controls the time switch, is provided for limiting the maximum charging period. Alternatively, the periods may also be derived from the mains frequency, however. The periods are then more exact as compared to the use of the RC-oscillator, and the expenditure in a subsequently connected frequency divider is reduced.

The advantageous properties of the inventive construction of the charge monitoring circuit on the primary side of the battery charger especially take effect if the switching power supply is a switching power supply which uses an auxiliary voltage generated in an auxiliary winding arranged on the transformer for regulating the output current and/or the output voltage of the switching power supply. The charge monitoring circuit may then advantageously be realized in the same integrated circuit which performs the regulation and the control of the switching power supply. This reduces the number of the required integrated circuits and thus also increases the reliability of the total assembly.

Moreover, in order to be able to use, in addition to the temperature rise on the battery, also a dropping secondary voltage as information for the reached full charging state an actual instant value of the secondary voltage, which corresponds to the battery voltage, may be determined and stored in the logic circuit. If this actual value is monitored, and if the instant value is reduced during several sampling values, the case of a so-called $-\Delta U$ has occurred and, upon exceeding a predetermined value, a switchover to a charge conservation may be performed. This actual instant value can, for example, ensue from a modulation of the operating point on the I/U characteristic by means of controlling the switch-off time of the switch on the primary side of the switching power supply.

According to an advantageous embodiment of the present invention the power supply is not completely switched off after the full charging state of the battery has been reached, but is adjusted such that a small charge conservation current is supplied to the battery. This advantageously prevents that the charge of the battery is reduced again.

In connection with the charging of lead accumulators it is known that the service life of the batteries can be increased by maintaining a so-called $IU_0U$ characteristic during the charging. This means that the battery is initially charged with a relatively high voltage and, after the charging current has dropped, the charging is continued with a reduced voltage until the full charge. According to an advantageous embodiment of the present invention such a $IU_0U$ characteristic may be realized by the charge monitoring circuit if the switching frequency of the switch on the primary side of the blocking oscillator-type converter is monitored and, if the frequency drops, the output voltage is reduced correspondingly.

Below, the invention will be explained in more detail by means of the advantageous embodiments shown in the accompanying drawings. Similar or corresponding details of the subject matter according to the invention are provided with identical reference numerals. In the drawings.

The structure and the function of the battery charger according to the invention shall hereinafter be explained in more detail with reference to the figures.

Figure 1:
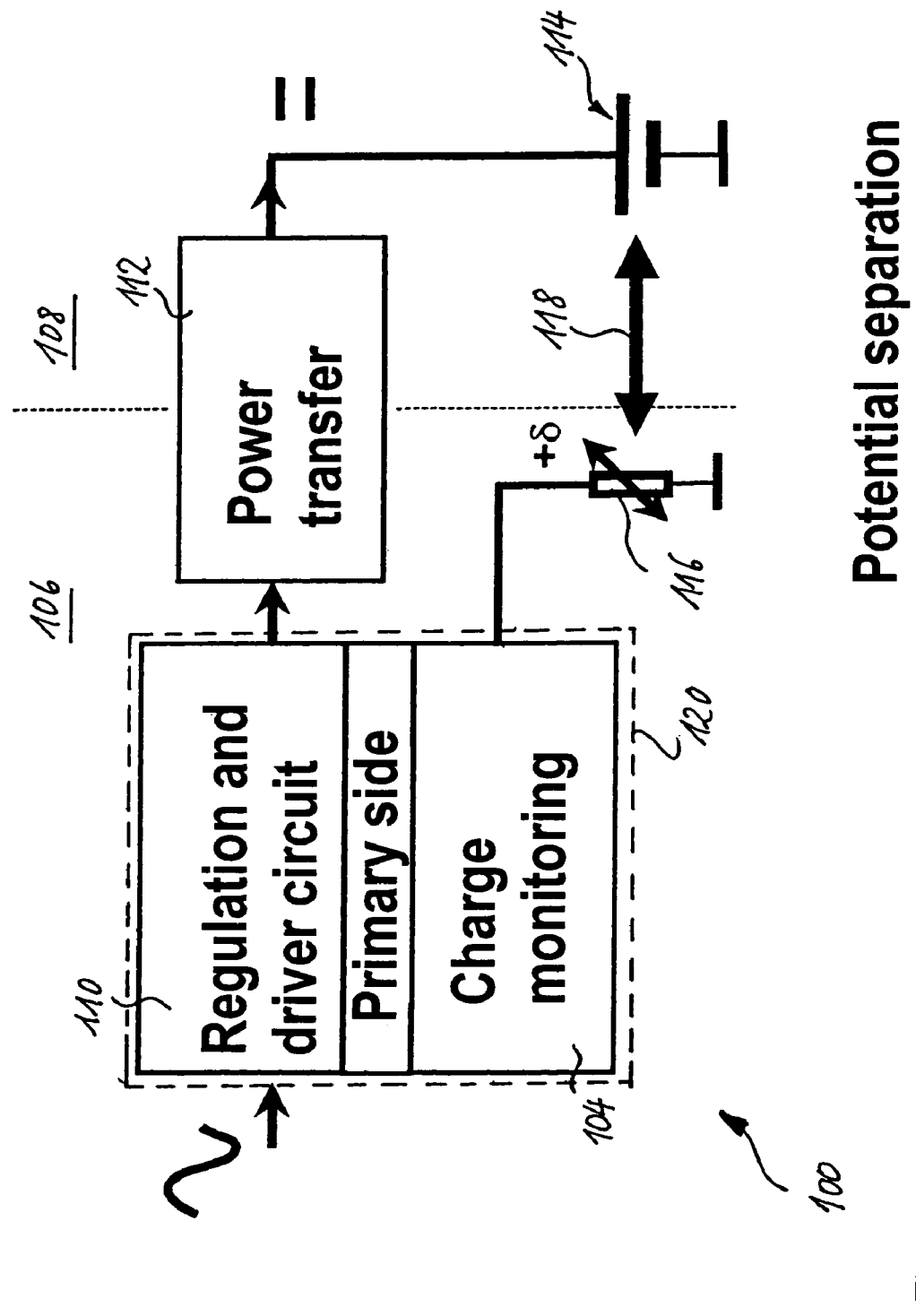
FIG. 1 shows a schematic section of the inventive battery charger according to a first embodiment.

As is shown in FIG. 1, the battery charger 100 according to the invention comprises a primary side 106 and a secondary side 108 which are separated from each other with respect to their potential.

According to the invention, both the regulation and driver circuit 110 for controlling the power transfer 112 and the charge monitoring circuit 104 are disposed on the primary side 106 of the battery charger 100. The power transfer device 112 is thereby typically a transformer which includes the required potential separation of the primary side 106 and the secondary side 108.

According to the invention, a resistor with negative temperature coefficients, a so-called NTC-resistor, 116 is directly thermally coupled with the battery 114. The thermal coupling is symbolized by the arrow 118 and includes an electrically isolated information transmission from the secondary side 108 to the primary side 106. The temperature information, which is supplied by the NTC-resistor 116, is transmitted to the charge monitoring circuit 104 accommodated in the so-called power management IC 120 together with the regulation and driver circuit 110. The regulation of the power transfer may then be accomplished on the basis of this information and additional information. Therefore, according to the invention, only one single IC 120 is required which includes the regulation and the charge monitoring, and the circuit complexity, the costs for the appliances and the construction size of the battery charger can therefore be reduced. Moreover, due to the smaller number of components and the complete waiver of an optoelectronic coupler for transmitting the information from the secondary side 108 to the primary side 106, the reliability of the device can clearly be increased.

Figure 2:
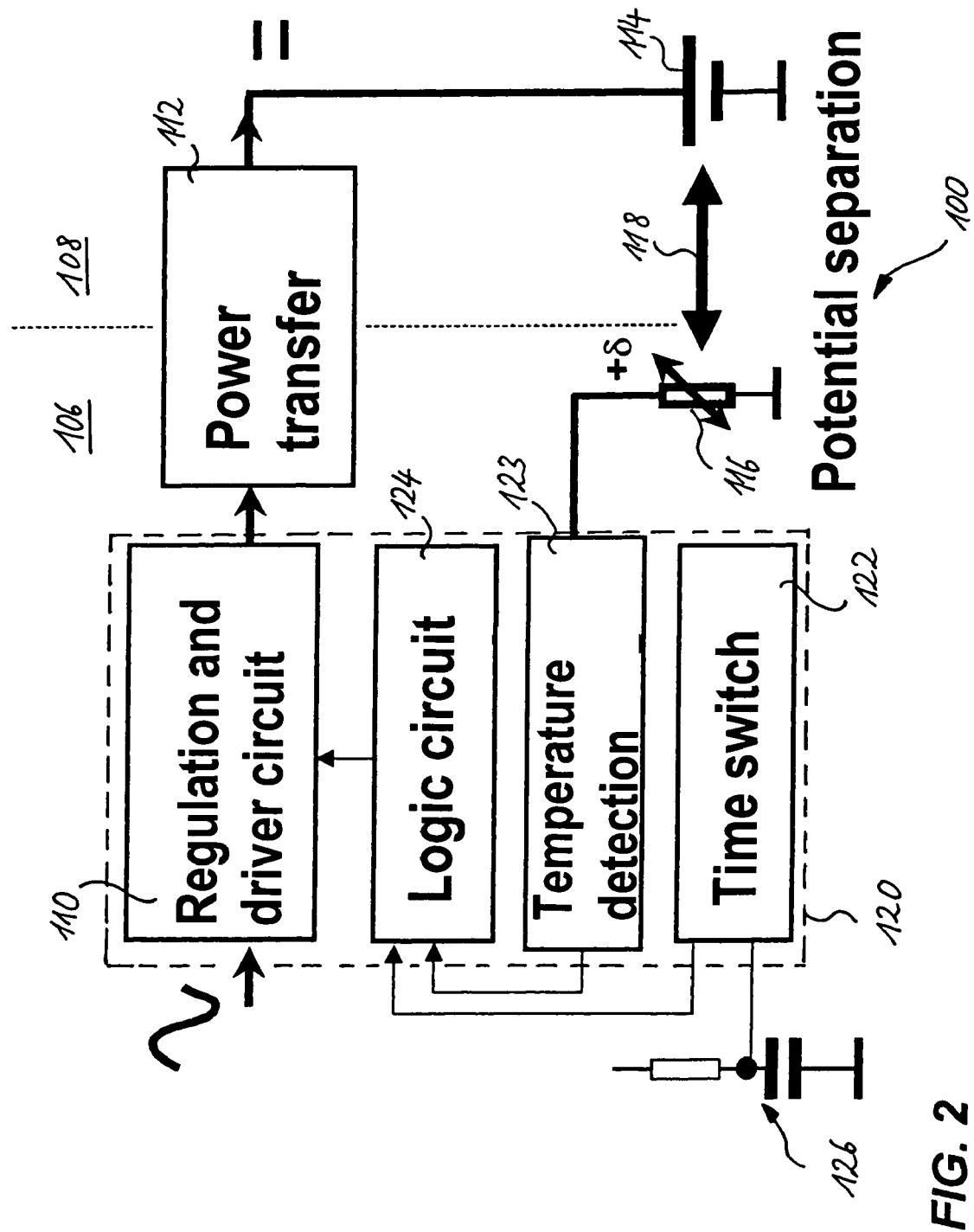
FIG. 2 shows a schematic section of the inventive battery charger according to a second advantageous embodiment.
Figure 3:
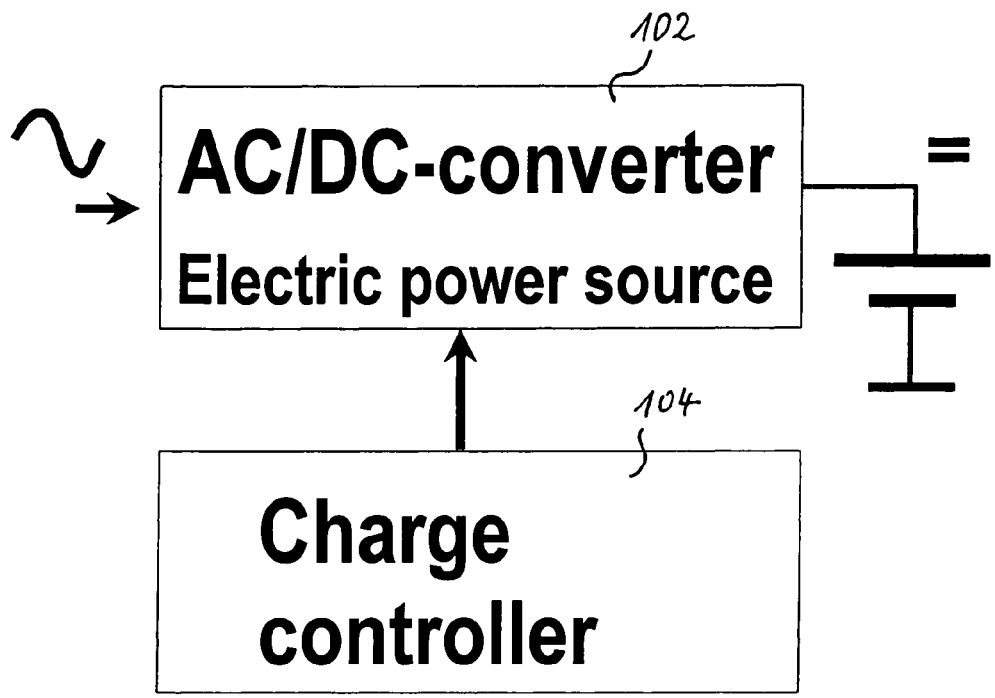
FIG. 3 shows a block diagram of the general structure of a battery charger.
Figure 4:
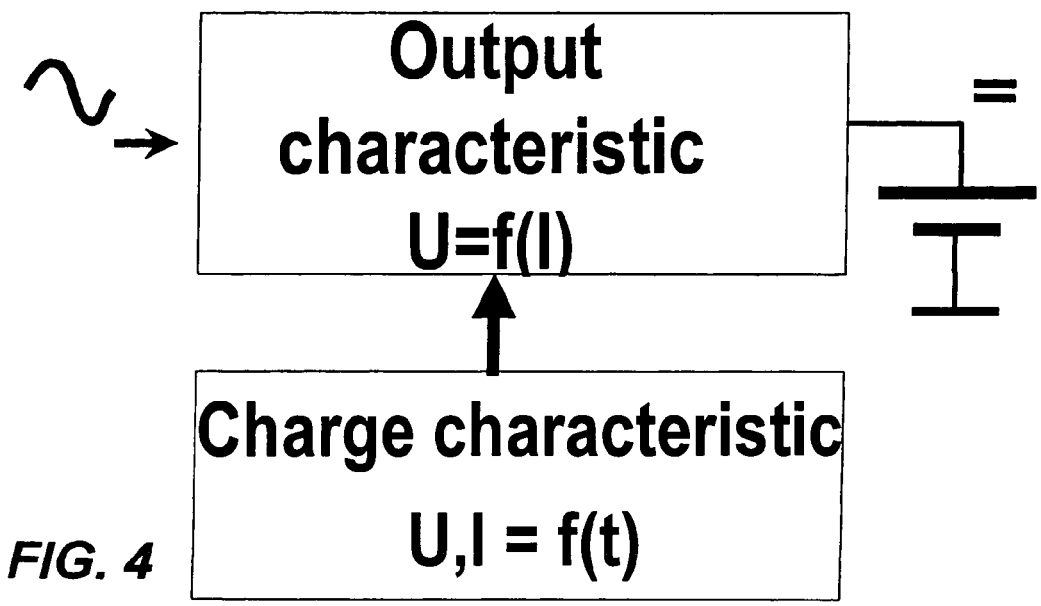
FIG. 4 shows another block diagram of the general structure of a battery charger.
Figure 5:
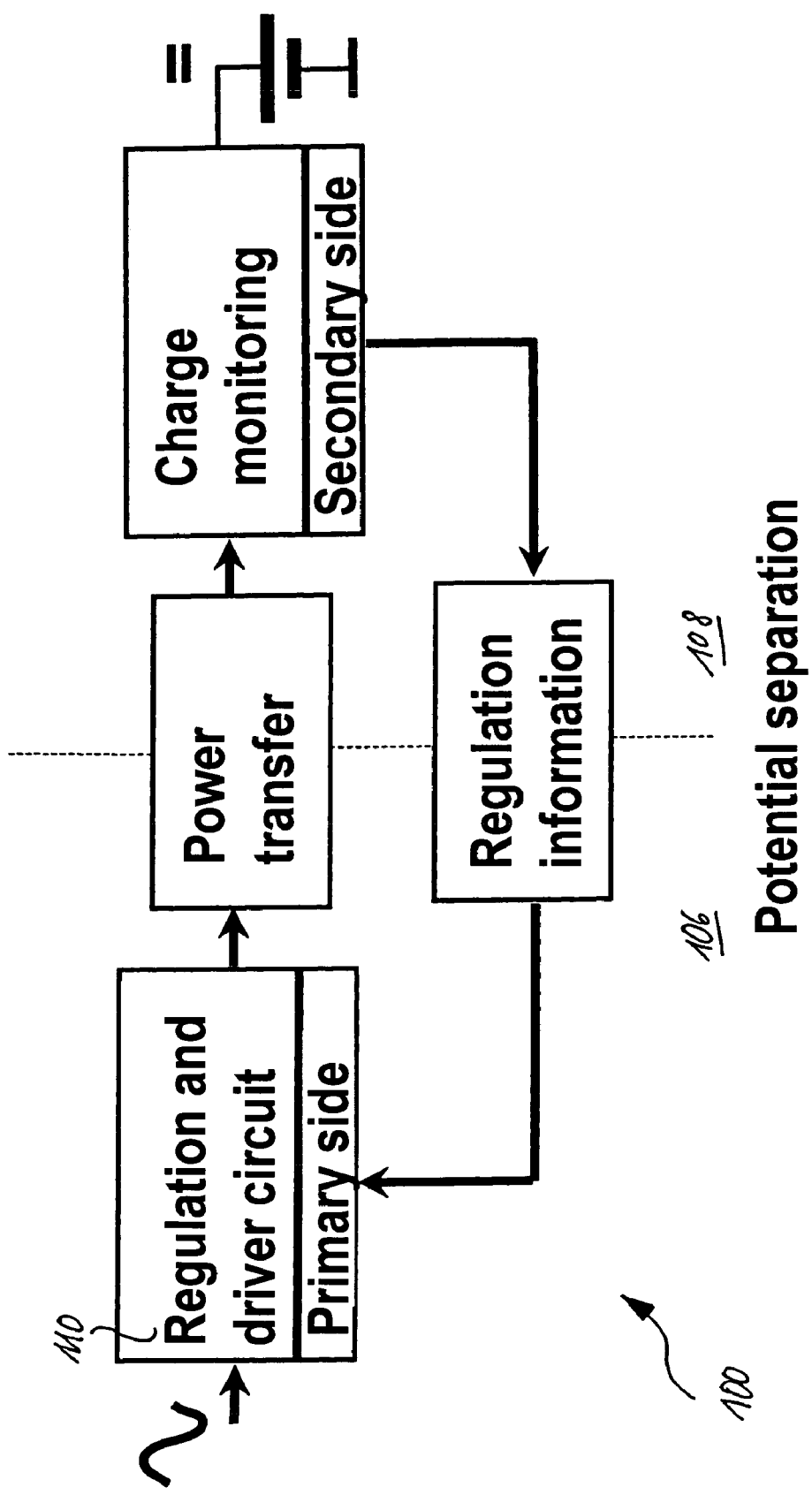
FIG. 5 shows a block diagram of a battery charger according to the prior art.

The block diagram of FIG. 2 shows the inventive battery charger 100 according to another embodiment in detail. According to the invention, the integrated circuit 120 comprises, apart from the components for the current-voltage regulation 110, a programmable time switch 122 for setting a maximum charging period as well as a temperature detection device 123 which terminates the charging process in dependence on a predetermined limiting value of the maximum temperature and/or a previously set temperature increase and/or a preset temperature rise speed and switches over to a small float charge current.

The temperature monitoring device 123 is connected to a temperature sensor, in this case, an NTC-resistor 116. The temperature sensor 116 is electrically isolated from the secondary side 108 by an appropriate isolation, such as by an extrusion coat, a shell, an encapsulation or the like, but is sufficiently thermally coupled for a heat transfer as is symbolized by the arrow 118. A logic circuit 124 performs the required logic operations and allows the preadjustment of the parameters.

Although it was always assumed in the foregoing that the power management IC 120 is an integrated circuit, which can, for example, be fabricated as an application-specific IC (ASIC), it is understood that the circuit 120 may also be a discretely structured circuitry.

The operation of the inventive battery charger 100 according to FIG. 2 shall be explained in more detail below.

According to the invention, merely the connections for the battery 114, which is provided with the necessary charging current by means of the power transfer device 112, are located on the secondary side 108. The temperature detection device 123 detects the temperature of the battery or of the accumulator and switches over to a float charging operation once a maximum value has been reached.

Alternatively or in addition, the temperature detection device 123 may also use a predefined temperature increase or the attainment of a representative temperature gradient as threshold for the termination of the actual charging process. The maximum charging current, which is formed by the I/U characteristic of the power portion, is thereby pulsed so as to generate the required smaller charge conservation current.

An adjustable oscillator 126 formed by an RC-module, which controls the time switch 122, limits the maximum charging period. Alternatively, the periods can also be derived from the mains frequency, however. The periods are then more exact as compared to the use of the RC-oscillator 126, and the expenditure in a subsequently connected frequency divider is reduced.

The logic circuit 124 combines the individual signals from the temperature detection device 123 and the time switch 122 and outputs them to the regulation and driver circuit 110 for the control of the blocking oscillator-type converter.

By a modulation of the operating point on the I/U characteristic by means of controlling the switch-off time of the switch on the primary side of the switching power supply an actual instant value of the secondary voltage, which corresponds to the battery voltage, can be determined. This instant value is stored in the logic circuit 124. If this instant value is reduced during several sampling values, which corresponds to a negative $\Delta U$, and exceeds a predefined value, the logic circuit 124 also causes the regulation and driver circuit 110 to switch over to a charge maintaining operation.

Due to the integration of the charge state monitoring in the power management IC on the primary side an additional so-called battery management IC on the secondary side may be waived, and a cost reduction, a reduction of space required and an increased reliability are achieved.

The invention claimed is:

1. Battery charger for charging a battery
   wherein the battery charger (100) comprises a switching power supply (102) controlled on the primary side with at least one converter connected to a switching circuit (106) on the primary side and to a switching circuit (108) on the secondary side, with a regulation and driver circuit (110) for regulating the power transferred to the secondary side (108), and a charge monitoring circuit (104) for monitoring the charge state of the battery,
   wherein the charge monitoring circuit (104) is disposed in the switching circuit (106) on the primary side of the battery charger (100).

2. Battery charger according to claim 1, wherein the charge monitoring circuit (104) comprises a temperature detection device (123) for detecting the temperature of the battery (114) and is designed so as to control the power transfer in response to the measured temperature.

3. Battery charger according to claim 2, wherein the temperature detection device (123) comprises a resistor with negative temperature coefficients (116) which is electrically isolated with respect to the battery (114).

4. Battery charger according to claim 1, wherein the charge monitoring circuit (104) comprises a time switching device (122) which terminates the power transfer after a predetermined charging period.

5. Battery charger according to claim 4, wherein the time switching device (122) comprises an oscillator circuit (126) for generating a time pulse.

6. Battery charger according to claim 4, wherein the time switching device (122) is designed so as to generate a time pulse from a mains frequency.

7. Battery charger according to claim 1, wherein the switching power supply (102) comprises a switch on the primary side and a transformer with an auxiliary winding in which, after opening the switch on the primary side, an auxiliary voltage is induced, and wherein the regulation and driver circuit (110) is designed so as to regulate the output voltage and/or the output current of the switching power supply in dependence on the induced auxiliary voltage.

8. Battery charger according to claim 1, wherein the battery charger further comprises a logic circuit (124) for storing values of the output voltage of the switching power supply as actual instant values of the battery voltage and for comparing consecutive actual values, wherein the logic circuit (124) is designed so as to terminate the charging process if the actual value is reduced during several consecutive samplings.

9. Battery charger according to claim 1, wherein the logic circuit (124) is designed so as to cause the regulation and driver circuit (110) after the termination of the charging process to transfer a small charge conservation current to the battery.

10. Battery charger according to claim 1, wherein the charge monitoring circuit (104) is designed so as to monitor the switching frequency of the switch on the primary side and to control the regulation and driver circuit (110) on the basis of the determined switching frequency such that an $IU_0U$ charge characteristic is adjusted.

* * * * *